United States Patent [19]
Basche et al.

[11] Patent Number: 5,969,233
[45] Date of Patent: Oct. 19, 1999

[54] CARBON CURRENT COLLECTING SHOE WITH DAMAGE DETECTOR FOR OPERATION WITH A HIGH CURRENT ELECTRICAL POWER SUPPLY

[75] Inventors: Bernd Basche, Amiens; Frédéric Guyot, Metz, both of France

[73] Assignee: Le Carbone Lorraine, Courbevoie, France

[21] Appl. No.: 09/055,758

[22] Filed: Apr. 7, 1998

[30] Foreign Application Priority Data

Apr. 14, 1997 [FR] France ................................. 97 04790

[51] Int. Cl.$^6$ ................................ G01M 3/26; B60L 5/08; B60L 5/20
[52] U.S. Cl. ...................................... 73/37; 73/40; 191/87
[58] Field of Search ............................. 73/37, 40; 191/87

[56] References Cited

U.S. PATENT DOCUMENTS

| | | | |
|---|---|---|---|
| 3,394,365 | 7/1968 | Nealis ........................................ | 191/87 |
| 4,578,546 | 3/1986 | Ferguson .................................. | 191/87 |
| 5,176,230 | 1/1993 | Odot .......................................... | 191/87 |
| 5,189,903 | 3/1993 | Hoffmann et al. ......................... | 73/40 |
| 5,244,065 | 9/1993 | Bartels et al. ............................. | 191/87 |

FOREIGN PATENT DOCUMENTS

| | | | |
|---|---|---|---|
| 3905962 | 4/1990 | Germany ................................... | 191/87 |
| 4425460 | 1/1996 | Germany ................................... | 191/87 |

*Primary Examiner*—Daniel S. Larkin
*Attorney, Agent, or Firm*—Dennison, Meserole, Scheiner & Schultz

[57] ABSTRACT

A current collecting shoe for transferring energy from a catenary wire to rolling stock, includes a sheath constructed and arranged for fixing to a pantograph carried by the rolling stock, a wearing strip including graphite mounted on the sheath, a longitudinal slot or boring in the wearing strip and a tubular section disposed within the boring or at least partially within the slot. The tubular section is thermally stable at a temperature of at least 400° C., and constructed of a material having a hardness of at least 4 on the Mohs scale and an electrical conductivity greater than graphite. This tubular section acts as an electrical conductor to transfer energy from the wearing strip to the rolling stock, and is constructed and arranged for sealing with a fluid therein and connection to a fluid pressure detection means. When excessive wear or breakage of the wearing strip causes perforation or breakage of the tubular section and loss of fluid pressure therein, this breakage is detected by the detection means which separates the wearing strip from the catenary wire before damage can occur.

14 Claims, 4 Drawing Sheets

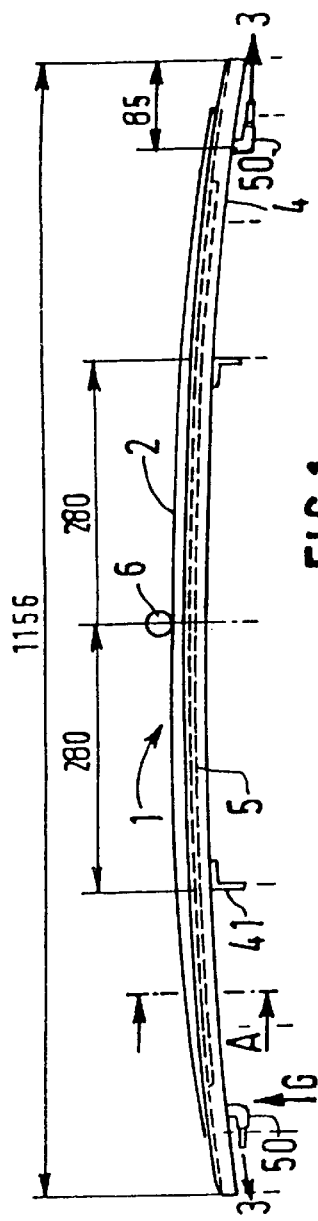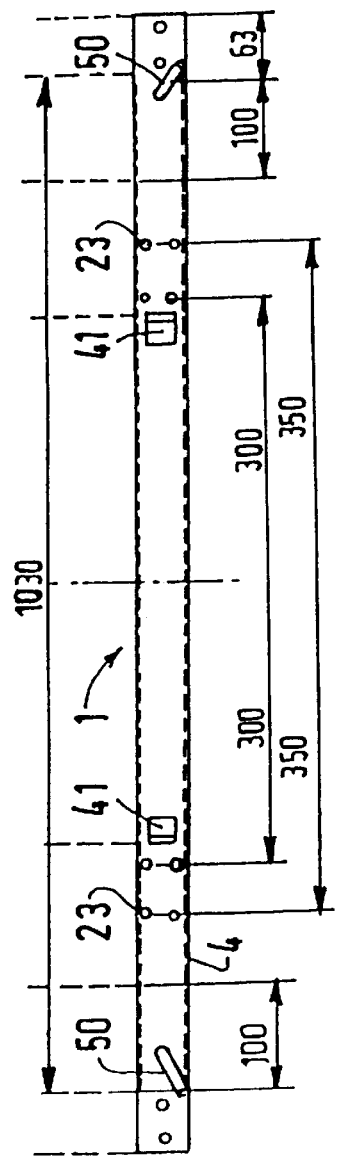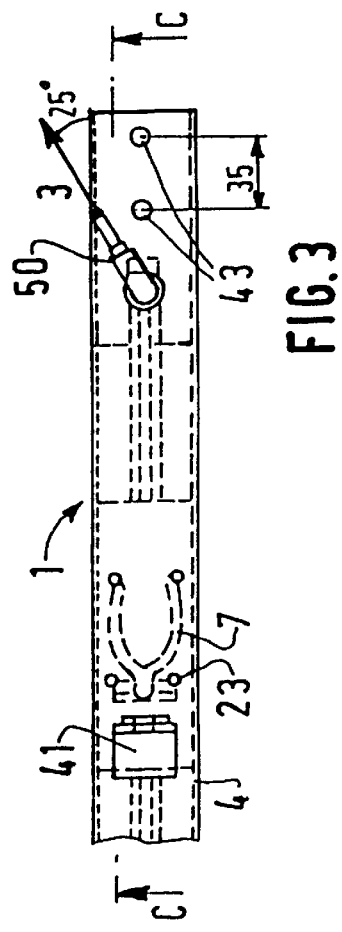

CARBON CURRENT COLLECTING SHOE WITH DAMAGE DETECTOR FOR OPERATION WITH A HIGH CURRENT ELECTRICAL POWER SUPPLY

BACKGROUND OF THE INVENTION

1. Field of the Invention

This invention relates to carbon current collecting shoes with damage detector, sometimes also referred to by other names such as "wearing strip" or "pantograph pad". These current collecting shoes are used to transfer electrical energy between a fixed electrical power distribution means, typically a catenary cable, and a mobile device consuming electrical energy, typically an electric train locomotive, which is fitted with a pantograph carrying said carbon current collecting shoe through a sheath fixed to said pantograph.

2. Description of Related Art

A number of patents have already been submitted describing carbon current collecting shoes comprising a damage detection device. The current collecting shoe comprises a sheath and a wearing strip usually provided on its inside surface with a slot containing or forming a sealed longitudinal chamber containing a fluid, such that if excessive wear occurs in said wearing strip, or if it breaks, then said chamber will no longer be sealed causing a leakage or a change of pressure in said fluid, the leak or pressure change in said chamber being detected, causing withdrawing of the pantograph and said current collecting shoe before any excessive damage is caused to the energy transfer equipment and particularly before the catenary wire or cable is damaged.

In British patent GB 1 374 972, said chamber is a tube made of silicon rubber or any other material, and particularly plastics such as PTFE, capable of resisting an operating temperature of, for example, 200° C.

In French patent FR-A1-2 663 592 in the applicant's name, said chamber is a tube made of carbonaceous material with the same mechanical properties as said wearing strip, in order to improve the detection sensitivity, particularly to the appearance of cracks in said wearing strip.

In U.S. Pat. No. 5,189,903 (=EP 415 972), said chamber is formed by the walls of said slot that are sealed by means of a sealing layer and by galvanic deposition of copper on said wearing strip and said slot.

In European patent EP-A1-402 666, said chamber is formed by the upper wall of said slot sealed using a resin, and by an Al or Cu or alloy metallic section open at the top.

The applicant has observed two types of problems when state-of-the-art current collecting shoes are used, and particularly current collecting shoes according to French patent FR-A1-2 663 592. The first problem is excessive sensitivity to the development of cracks in said wearing strip, and the second is its unsuitability for distributing electrical power at low voltage (and high current).

Firstly, it was found that unjustified detection occurs when there is a crack in said wearing strip when said wearing strip is still in working conditions; this is a prohibitive defect since it is unacceptable for a train to stop in the open country due to a simple crack in a wearing strip, since many cracks do not automatically and quickly develop towards damage or a risk of damage that would justify changing the current collecting shoe, the damage typically consisting in the rupture or breaking of the wearing strip and separation of blocks of carbonaceous material forming said wearing strip.

Secondly, particularly with Trans-European high speed trains it has been found that state-of-the-art current collecting shoes are not suitable for all types of electrical energy distribution systems in all the countries passed through, and particularly they are not suitable for an electrical power supply at relatively low voltage, for example 1.5 kV (but with a high current, for example 1100 A or more). In the latter case, and particularly with current collecting shoes made according to French patent FR-A1-2 663 592, a very high increase in the current collecting shoe temperature has been observed, which may reach or exceed 500° C. which would appear to be prejudiciable to the life of the current collecting shoes and the strength of the bond between the wearing strip and the sheath (weld, bonding, etc.) and consequently reducing the electrical current between the wearing strip and the sheath, the role of the sheath being to support said wearing strip and usually also to conduct the electrical current between the wearing strip and the input to the motor power supply circuit in the locomotive.

Therefore, the object of this invention is a carbon current collecting shoe with a damage or wear detector which is not sensitive to simple cracks and which is suitable for the various electrical power supplies, and particularly a low voltage and therefore high current power supply particularly in the case of Trans-European high speed trains (TGV).

Furthermore, the current collecting shoe according to the invention must satisfy other criteria or constraints imposed by their use, in particular weight and aerodynamics, so that the current collecting shoe has a stable behavior at all speeds, and particularly at very high speed.

SUMMARY OF THE INVENTION

The carbon current collecting shoe with damage detector according to the invention used to transfer energy from a catenary wire to rolling stock, comprises a wearing strip mounted on a sheath fixed to a pantograph, said wearing strip comprising graphite and being provided with a sealed longitudinal chamber containing a fluid connected to a detection device such that if there is any excessive wear, or if said wearing strip should break, said chamber will break or be perforated causing a change in the pressure in said fluid, detection of this change causing the pantograph and the sheath supporting said wearing strip to be withdrawn before excessive damage occurs to energy transfer means and particularly to the catenary wire, and is characterized in that said longitudinal chamber is composed of a sealed tubular section made of a material that is thermally stable at temperatures up to at least 400° C., with a hardness of less than 4 (Mohs scale), and with electrical conductivity at least greater than that of graphite, so that it can act as an electrical conductor when transferring electrical energy from said wearing strip to said rolling stock.

Therefore, the invention can be defined as the use of any material with a combination of the above mentioned characteristics, to form said sealed section. This combination of means is essential to solve the problem posed.

The applicant has tested many current collecting shoe configurations based on the state of the art, but has only succeeded in solving the problem posed by having the idea of using said section as an electrical conductor with high conductivity in order to shunt part of the current through said section and thus reduce said thermal stresses in said wearing strip, and secondly of hierarchizing the problems by giving priority to protection of the catenary wire and to detect only defects that could endanger the catenary wire.

Therefore, the applicant has deliberately avoided the conventional approach which is to attempt to detect cracks that appear in said wearing strip as quickly as possible.

BRIEF DESCRIPTION OF THE DRAWINGS

All the figures show current collecting shoes according to the invention.

FIG. 1 is a longitudinal sectional view of the current collecting shoe (1), with the section in the vertical direction so that its radius of curvature can been seen (radius of curvature 9.965 m). FIG. 1 shows the section (5) in dashed lines, each end of this section being fitted with a connection elbow (50) to the detection device (3) not shown. Reference 6 in FIG. 1 shows the catenary wire.

FIG. 2 is the corresponding bottom view (along direction G in FIG. 1). The length of the sheath (4) is 1.156 m. The length of the wearing strip is 1.030 m, and its thickness reduces over 100 mm towards each end.

FIGS. 1 and 2 show the position of the two connection elbows (50) and the position of the fixing lugs (41) of the sheath (4) to the pantograph (not shown). FIG. 2 shows the position of the eight fixing holes (23) in which the current conducting cables are fixed (not shown on this figure).

FIG. 3 is an enlarged partial bottom view of the end of the current collecting shoe (1) according to FIG. 2, which shows complementary means (43) of fastening the sheath (4) to the pantograph, and conducting cables (7) in dashed lines.

DESCRIPTION OF THE PREFERRED EMBODIMENTS

Figure 4:
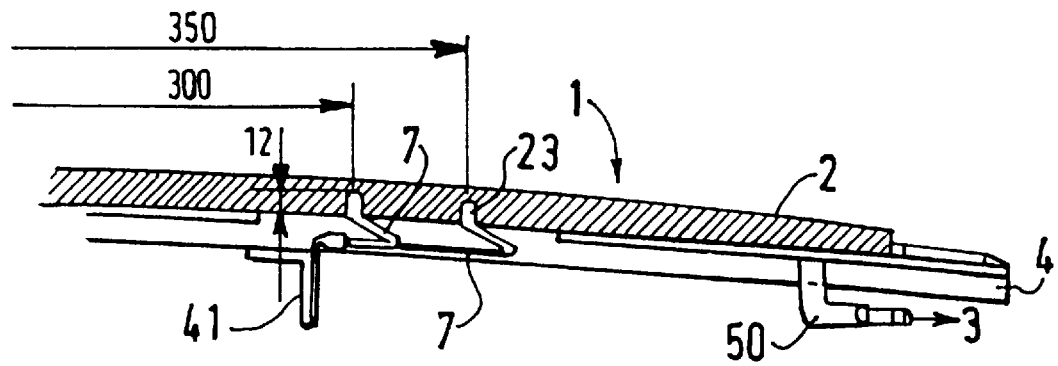
FIG. 4 is a partial longitudinal sectional view along axis CC in FIG. 3 illustrating the layout of conducting cables (7) fixed to the wearing strip (2) by fixing holes (23). These conducting cables are connected to the metal lugs (41) on sheath (4).

According to the invention, said section (5) is, preferably, a metal tube placed at least partly in a longitudinal slot (20) formed on the lower surface of said wearing strip (2).

As examples, FIGS. 7a to 7i illustrate the large variety of possible embodiments for the section (5), the shape of said longitudinal slot (20), and the shape and possible presence of said longitudinal groove (42) on the base (44) of the sheath (4).

Instead of placing said section in a slot, which is relatively easy to form by machining, said section or metal tube (5) can also be placed in a longitudinal reaming formed in the body of said wearing strip (2).

Figure 5:
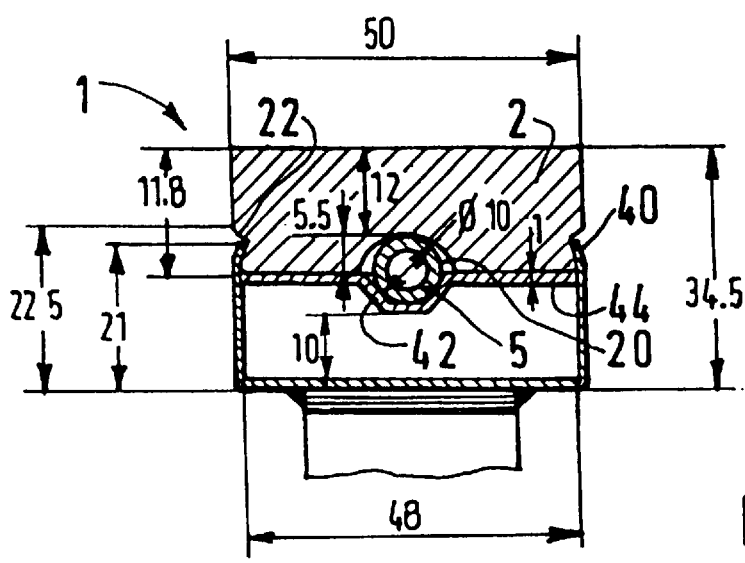
FIG. 5 is the cross-sectional view of the current collecting shoe (1) along direction A—A in FIG. 1. This figure illustrates, firstly, the method of assembling the wearing strip (2) with sheath (4), by cooperation of the longitudinal crimping rim (22) between the wearing strip (2) and the upstand (40) of the sheath (4), and secondly, how the section (5) is stuck in a slot (20) in the wearing strip (2) and in a longitudinal groove (42) in the base (44) of the sheath (4).
Figure 6:
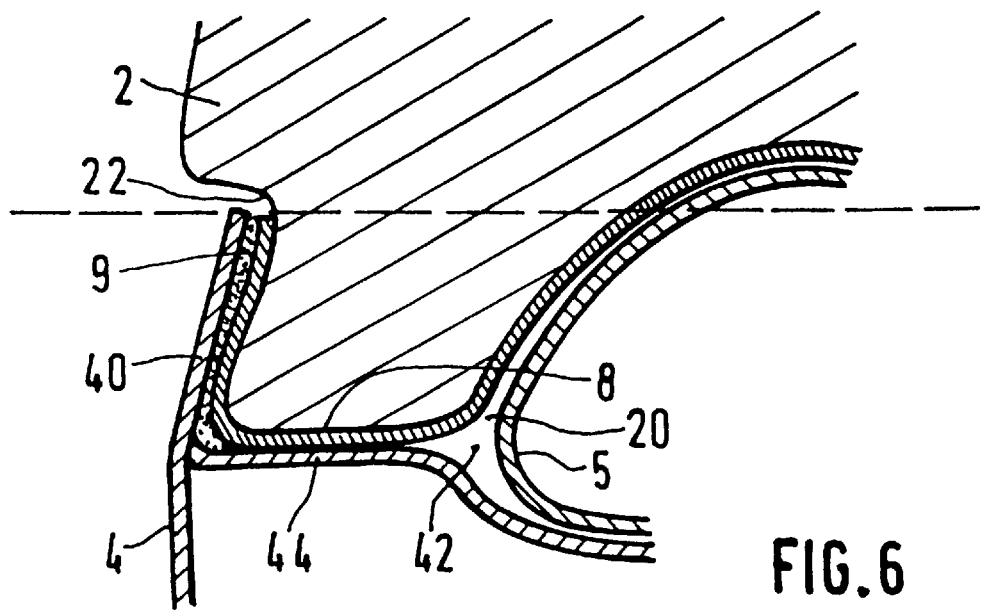
FIG. 6 is a partial enlarged view of FIG. 5. On this figure, the lower part of the wearing strip (2) is coated with a thin metal layer (8) (copper electrolytic deposit) with a typical thickness of 10 μm so that said wearing strip (2) bottom can be welded to the upstand (40) of the sheath (4) by weld (9).
Figure 7A:
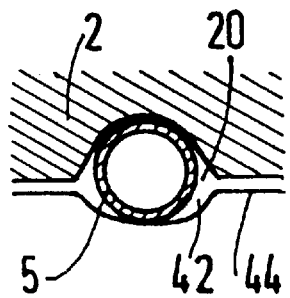
FIGS. 7a to 7i illustrate various embodiments of the invention, differing by the shape, and the area of said section (5), by the corresponding shape of the wearing strip (2) slot (20), by whether or not there is a longitudinal groove (42) present on the base (44) of the sheath (4), or by the thickness of the section (5)—thicker section shown in FIGS. 7d, 7e and 7i.
Figure 7B:
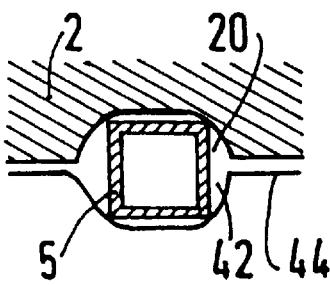
Figure 7C:
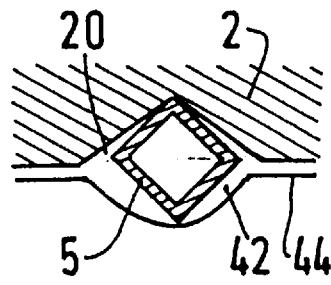
Figure 7D:
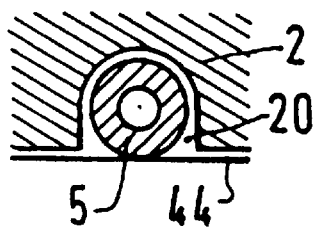
Figure 7E:
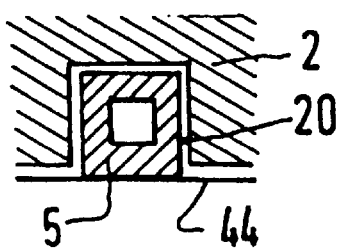
Figure 7F:
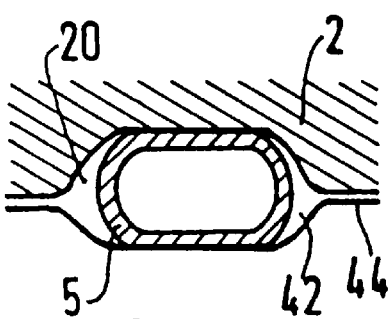
Figure 7G:
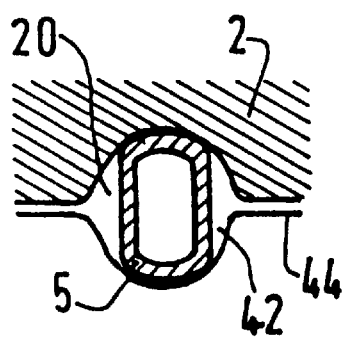
Figure 7H:
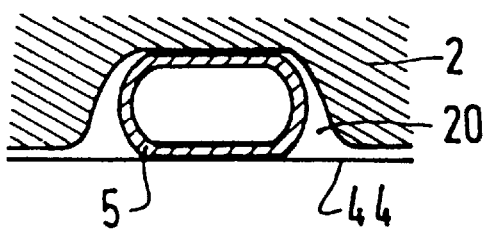
Figure 7I:
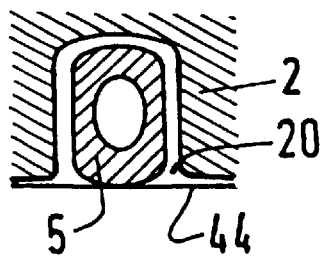
Figure 8A:
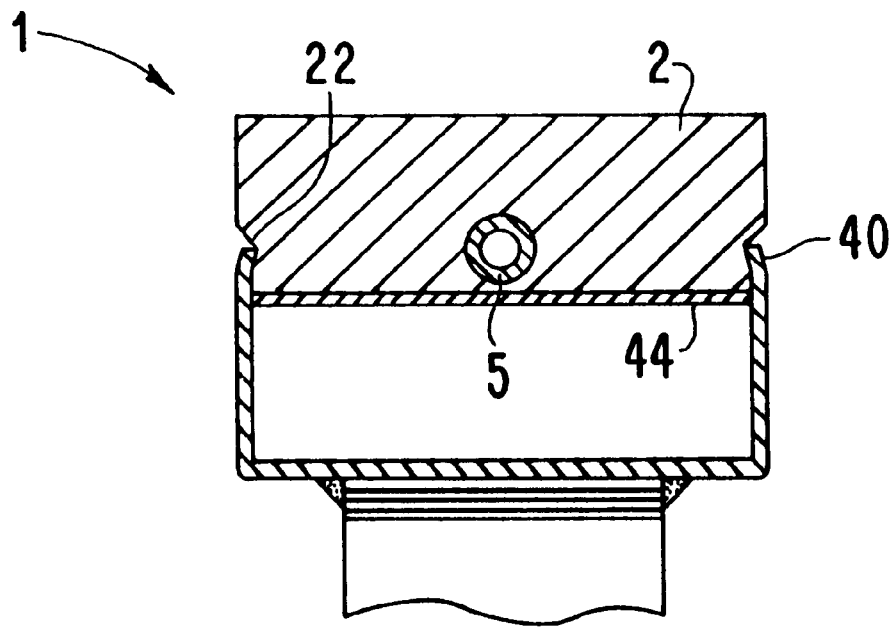
FIGS. 8a and 8b are cross-sectional views of the current collecting shoe along line a—a in FIG. 1, showing the tubular section disposed within a longitudinal boring in the wearing strip.
Figure 8B:
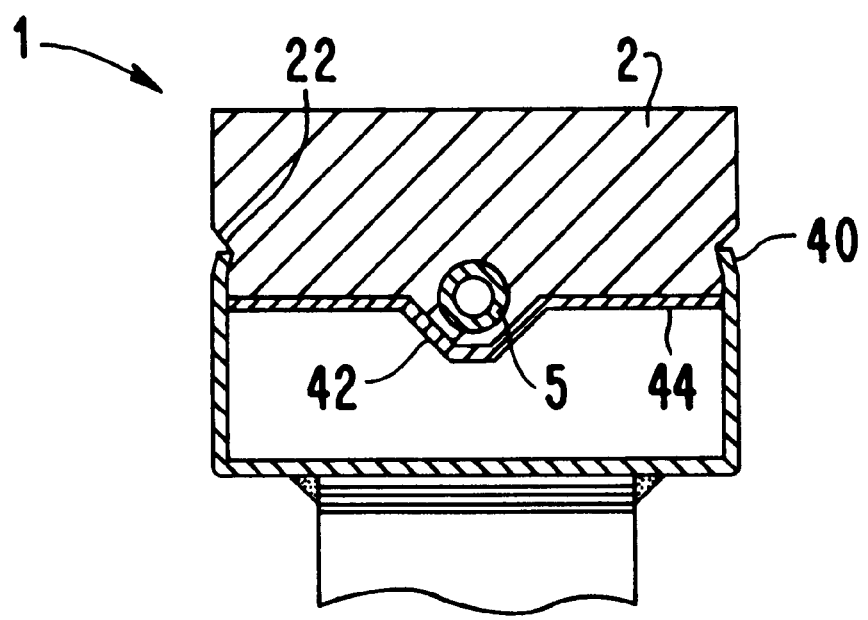

If said section (5) is to be able to perform its role as protector of the catenary wire (6), the elevation of the top of said sealed section (5) must be higher than the elevation of the top of the side upstands (40) of said sheath (4) by at least the thickness of said section, as is clearly shown in FIGS. 5 and 6, so that after wear or breakage of said wearing strip (2), said catenary wire (6) comes into contact with said section (5) and penetrates it before it comes into contact with said side upstands (40).

It is advantageous according to the invention that said section (5) has sufficient freedom in the longitudinal direction so that it can expand/contract in this direction without affecting the performances of said current collecting shoe.

It is also advantageous that this is so regarding ease of assembly since the fixing of said section is automatically achieved by assembling said wearing strip (2) with said sheath (4), said assembling resulting in the gripping of said section (5).

As described above, one of the problems to be solved is the heating of said current collecting shoe (1), and particularly said wearing strip (2), when said rolling stock is powered by high currents. The solution according to the invention is designed to divert part of the current passing between the catenary wire (6) and the cables (7) through said electricity conducting section (5). Therefore, according to the invention, the thickness and the area of said section (5) should be chosen particularly as a function of the fraction of the total current density corresponding to said electrical power transfer, that is to be carried in said section (5). Preferably, the thickness and the area of said section (5) are chosen so that at least 10% of the total current density transferred between the catenary wire and the rolling stock can be transferred longitudinally.

For practical reasons, said section (5) is, preferably, a metal tube that is a good electrical conductor, chosen from Cu and Cu alloy, Al and Al alloy tubes. Preferably, the lightest possible and best possible conducting metals and alloys will be chosen. The electrical resistivity at ambient temperature is preferably less than 20 μΩ cm, and more preferably less than 12 μΩ cm.

Said section (5) advantageously has a cross-sectional area at least equal to 10 mm$^2$, or preferably greater than 50 mm$^2$, so that a significant current density can pass in said section, the current density in a copper electrical conductor, typically, being of the order of 5 A per mm$^2$. For practical reasons, the area of said cross-section is generally below 100 mm$^2$.

It is also advantageous if said wearing strip (2) is composed of graphite impregnated with copper, in order to reduce the resistivity of the wearing strip (2).

According to one embodiment of the invention, the current collecting shoe (1) comprises cables (7) anchored in said wearing strip in order to transfer energy from the catenary wire to said rolling stock. But these cables may be dispensed with, provided that energy is also transferred through the sheath (4) or through the cables welded to the thin metal layer (8) deposited on the bottom of the wearing strip (2).

The catenary wire (6) is a copper alloy, typically, a CuAl type alloy. The hardness of the material of which said section (5) is made, may preferably be less than that of the catenary wire (6), in order to minimize the risk of damaging the catenary wire (6).

Advantageously, said section (5) has good thermal conductivity properties together with its electrical conductivity properties. Therefore, it can be used to cool said wearing strip, possibly by circulating a fluid in said section, or by connecting said section to any heat exchange means capable of dissipating heat. The thermal conductivity is, preferably, greater than 0.1 W/cm.K, or even more preferably is greater than 1 W/cm.K.

Example Embodiment

The carbon current collecting shoe shown in FIGS. 1 to 5 was made with the dimensions shown on said figures, as a non-limitative example.

The wearing strip (2) is made of graphite impregnated with 20% by weight of copper. An electrolytic copper deposit was made on the lower part of said wearing strip forming a copper layer about 10 μm thick necessary to bond said wearing strip to the upstands (40) of the sheath (4). The sheath (4) is made of steel. The section (5) is a 10 mm diameter 2.5 mm thick copper tube with a cross-sectional area of 59 mm².

Said current collecting shoe (1) is assembled by crimping said wearing strip (2) in the upstands (40) of the sheath (4), and by welding said upstands (40) with the part facing said wearing strip (2), after a weld layer (9) has been deposited between the upstands (40) and the part facing said wearing strip (2).

The section (5) is fixed when said wearing strip (2) is crimped in the upstands (40) of the sheath (4) and is, therefore, gripped between said wearing strip and said sheath, which, however, makes longitudinal expansion/contraction still possible when said current collecting shoe is heated or cooled.

As can be seen in FIGS. 2, 3, and 4, four fixing holes (23) have been formed in said wearing strip (2) on each side of the fixing lugs (41)—that is a total of eight holes—in order to seal the ends of the conducting cables (7). In this example embodiment, these conducting cables are not in electrical contact with said section (5). However, as illustrated in FIG. 4, these conducting cables are in electrical contact with the fixing lugs (41), which are themselves in electrical contact with the sheath (4) and are welded to it.

The carbon current collecting shoe according to the invention was tested on high speed trains (TGV) on an instrumented pantograph, particularly, to measure the temperature of said wearing strip (2).

In the case of a low voltage and high current (1100 A) power supply, it has been observed that the maximum temperature reached in said wearing strip was about 300° C., compared with a temperature of about 600° C. using a state-of-the-art current collecting shoe. This large temperature difference has important effects; firstly, welds or brasings melt or there is a risk of melting at temperatures exceeding 300° C., and secondly, risks of oxidation and embrittlement of the wearing strip apparently increase with the temperature. It is possible that the risks of cracks appearing in current collecting shoes according to the invention are lower than in current collecting shoes according to the prior art, since the risks of thermal shocks are lower.

Furthermore, the possible presence of cracks in the wearing strip (2) according to the invention had no consequence and did not cause withdrawing of the pantograph, thus stopping the TGV unnecessarily.

According to this invention, the pantograph is withdrawn after the section (5) has been perforated by friction or when arcs are formed with the catenary wire, mainly to protect the TGV line and prevent damage to the catenary wire (6); it is always preferable to stop a TGV rather than risk damaging the TGV line over several kilometers; however, it would be completely unwise to stop a TGV in the open country simply because there is a crack in the current collecting shoe wearing strip. Therefore, the objective is to guard against the risk of serious accidents that could damage the TGV line, and not to detect initiating damage of the wearing strip. Wear of current collecting shoe wearing strips (1), and their replacement following normal wear, are part of routine maintenance measures.

Advantages of the Invention

By adopting an approach different to that of the state of the art, the invention has been able to easily and economically solve problems caused by known state-of-the-art current collecting shoes.

Therefore, the invention is not limited to the means described above, but also covers a large number of embodiments based on temperature control of said current collecting shoe using at least one electrical conducting section with a suitable geometry.

If necessary, according to the invention, it would be possible to reduce the temperature of said current collecting shoe even further, for example by adding at least one other section (non-tubular) to said tubular section, made of a material conducting heat and electricity, and designed to contribute to carrying the current and transporting heat in order to cool the central, hotter, part of said wearing strip.

What is claimed is:

1. Current collecting shoe for transferring energy from a catenary wire to rolling stock, and including damage detection means, comprising:

a sheath constructed and arranged for fixing to a pantograph carried by the rolling stock;

a wearing strip comprising graphite mounted on the sheath;

a longitudinal slot or boring in the wearing strip; and a tubular section disposed within the boring or at least partially within the slot, said tubular section being thermally stable at a temperature of at least 400° C., and constructed of a material having a hardness of less than 4 on the Mohs scale and an electrical conductivity greater than graphite, said tubular section acting as an electrical conductor to transfer energy from said wearing strip to the rolling stock;

said tubular section being constructed and arranged for sealing with a fluid therein and connection to a fluid pressure detection means, wherein excessive wear or breakage of said wearing strip causes perforation or breakage of said tubular section and loss of fluid pressure therein which is detected by the detection means.

2. Current collecting shoe according to claim 1, wherein said section comprises a metal tube disposed at least partially within the slot.

3. Current collecting shoe according to claim 1, wherein said section comprises a metal tube disposed within the boring.

4. Current collecting shoe according to claim 1, wherein said section includes a top portion disposed at a higher elevation than any portion of the sheath.

5. Current collecting shoe according to claim 4, wherein said this section has a longitudinal degree of freedom sufficient to enable expansion and contraction of the section.

6. Current collecting shoe according to claim 1, wherein said the section has a thickness and area selected as a function of current density which will pass through said section.

7. Current collecting shoe according to claim 6, wherein the thickness and area of said section are selected to transfer longitudinally at least 10% of total current density transferred between the catenary wire and the rolling stock.

8. Current collecting shoe according to claim 1, wherein said section is metal tube comprising Cu, a Cu alloy, Al or an Al alloy.

9. Current collecting shoe according to claim 1, wherein said section has a surface area of at least 10 mm$^2$.

10. Current collecting shoe according to claim 9, wherein said surface area is greater than 50 mm$^2$.

11. Current collecting shoe according to claim 1, wherein said wearing strip comprises graphite impregnated with copper.

12. Current collecting shoe according to claim 1, additionally comprising cables anchored in said wearing strip for transfer of energy from the catenary wire to the rolling stock.

13. Current collecting shoe according to claim 1, wherein said section has a hardness less than the catenary wire.

14. Current collecting shoe according to claim 1, wherein said section is thermally conductive, and serves thereby to cool the wearing strip.

* * * * *